United States Patent
Winters

(10) Patent No.: US 6,439,670 B1
(45) Date of Patent: Aug. 27, 2002

(54) WHEEL HOLE INSERT FOR PROTECTING AND ALTERING THE APPEARANCE OF WHEELS

(76) Inventor: David Winters, R.R. #1 - Box 162, Glenwood, MO (US) 63541

( * ) Notice: Subject to any disclaimer, the term of this patent is extended or adjusted under 35 U.S.C. 154(b) by 0 days.

(21) Appl. No.: 09/603,145

(22) Filed: Jun. 23, 2000

(51) Int. Cl.$^7$ ................................................ B60B 7/00
(52) U.S. Cl. .............................................. 301/37.101
(58) Field of Search ........................ 301/37.101, 37.28, 301/37.373

(56) References Cited

U.S. PATENT DOCUMENTS

| | | | | |
|---|---|---|---|---|
| 655,393 A | * | 8/1900 | Coleman | 301/37.1 |
| 2,392,634 A | * | 1/1946 | Bierman | 301/37.1 |
| 3,337,271 A | * | 8/1967 | Lyon | 301/37.1 |
| 3,367,722 A | * | 2/1968 | Miyanaga | 301/37.1 |
| 3,481,652 A | * | 12/1969 | Mazerolle | 301/37.1 |
| 4,235,476 A | * | 11/1980 | Arvidsson | 301/37.1 |
| 4,316,637 A | * | 2/1982 | Reynolds et al. | 301/37.1 |
| 4,317,597 A | * | 3/1982 | Golata et al. | 301/37.1 |
| 5,058,959 A | * | 10/1991 | Miles et al. | 301/37.1 |
| 5,078,453 A | * | 1/1992 | Siwek | 301/37.1 |
| D332,441 S | * | 1/1993 | Douglas, Jr. | D12/204 |
| 5,188,429 A | * | 2/1993 | Heck et al. | 301/37.1 |
| 5,286,092 A | * | 2/1994 | Maxwell, Jr. | 301/37.1 |
| 5,441,334 A | * | 8/1995 | Botterman et al. | 301/37.1 |
| 5,443,582 A | * | 8/1995 | Ching | 301/37.37 |
| 5,458,401 A | * | 10/1995 | Baccman | 301/37.1 |
| 5,667,281 A | * | 9/1997 | Ladouceur | 301/37.1 |

* cited by examiner

Primary Examiner—S. Joseph Morano
Assistant Examiner—Long Bae Nguyen
(74) Attorney, Agent, or Firm—McKee, Voorhees & Sease, P.L.C.

(57) ABSTRACT

Disclosed is an apparatus for protecting and altering the appearance of wheels. This apparatus, a wheel insert, is adapted to fit within a wheel hole of a wheel and thereby alter the wheel's appearance, protect the wheel hole, and keep the wheel hole clean. The wheel insert has a lining portion adapted to fit within a wheel hole, and exterior portion extending beyond the outer surface of the wheel hole and a securing portion for maintaining the wheel insert in a proper position. The wheel insert may be friction fit or snap fit within the wheel hole through the use of tabs of plugs. The wheel insert is made of plastic and is chrome plated. The wheel insert may be any desired shape or size and include a solid surface or rim.

20 Claims, 4 Drawing Sheets

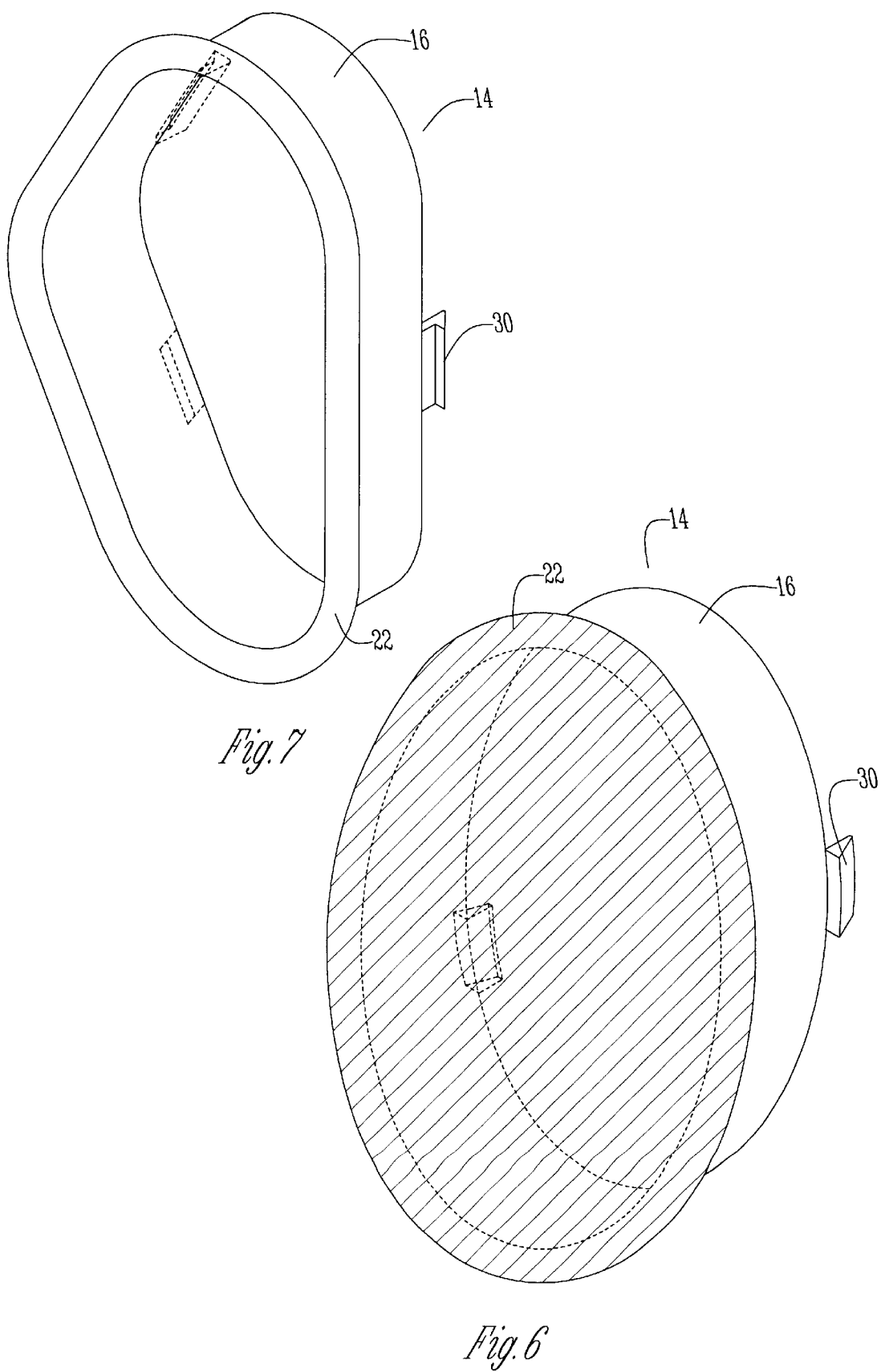

WHEEL HOLE INSERT FOR PROTECTING AND ALTERING THE APPEARANCE OF WHEELS

BACKGROUND OF THE INVENTION

1. Field of the Invention

The present invention relates generally to an apparatus for altering and protecting the appearance of wheels and more particularly to a wheel insert which may be placed within a wheel spoke hole in order to alter the appearance of the wheel spoke hole and keep the wheel spoke hole clean.

2. Problems in the Art

Currently, automotive-type wheels are often chrome plated or covered in some other type of material in order to give the wheels a more appealing appearance. These wheels often contain many holes of various shapes and sizes which are difficult to finish or coat in a decorative material. Further, such holes are difficult to clean because they are both non-finished and simply hard to get to.

There is therefore a need to provide a wheel insert which may be used in wheel holes of various sizes and shapes. Additionally, there is a need to provide a wheel insert which may increase the aesthetic appeal of the wheel. Further, it is desirable to have a wheel insert which allows a user to keep the wheel portion defining the wheel hole clean. There is therefore an unfulfilled need for a wheel insert which solves these and other problems. This invention has as its primary objective fulfillment of this need.

FEATURES OF THE INVENTION

A general feature of the present invention is the provision of a wheel insert which overcomes the problems found in the prior art.

A further feature of the present invention is the provision of a wheel insert which changes the aesthetic appearance of a wheel hole.

Another feather of the present invention is the provision of a wheel insert which simplifies cleaning of the wheel.

As still further feature of the present invention is the provision of a wheel insert which snaps into a wheel hole.

Another feature of the present invention is the provision of a wheel insert which is friction fit into a wheel hole.

A further feature of the present invention is the provision of a wheel insert which is chrome plated.

Another feature of the present invention is the provision of wheel inserts of various sizes and shapes.

These, as well as other features and advantages of the present invention, will become apparent from the following specification and claims.

SUMMARY OF THE INVENTION

The present invention generally comprises a wheel insert including a lining portion, an exterior portion, and a securing portion. In a preferred embodiment, the present invention includes a lining portion which extends radially along the outer edge of the wheel hole, parallel to the wheel hole's radial axis, an exterior rim extending beyond the outer surface of the wheel hole and beyond the diameter of the wheel hole, and a means for securing the wheel insert in the wheel hole. The wheel insert of the present invention may be altered to fit any size or shape of wheel hole and may be further altered to give any desired appearance. The wheel insert of the present invention may simply line the wheel hole, or may include a solid surface on which various designs, logos, words, etc. may be displayed.

BRIEF DESCRIPTION OF THE DRAWINGS

FIG. 6 is a perspective view of an oval-shaped wheel insert of the present invention.

FIG. 7 is a perspective view of an alternatively shaped wheel insert of the present invention.

DETAILED DESCRIPTION OF THE PREFERRED EMBODIMENT

The present invention will be described as it applies to its preferred embodiment. It is not intended that the present invention be limited to the described embodiment. It is intended that the invention cover all modifications and alternatives which may be included within the spirit and scope of the invention.

Figure 1:
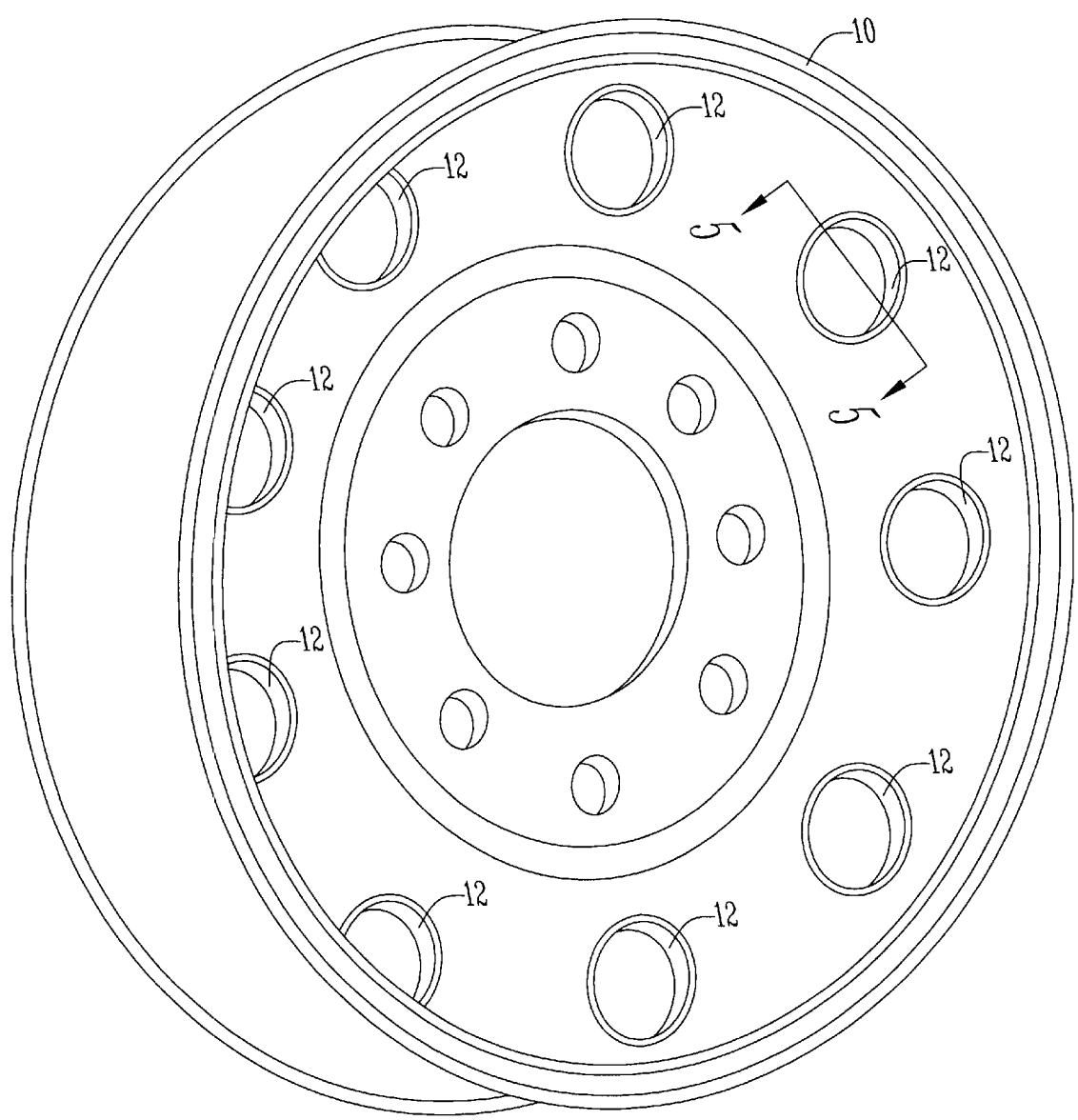
FIG. 1 is a perspective view of a typical automotive-type wheel containing several wheel holes into which the wheel insert of the present invention may be placed.

A typical automotive-type wheel 10 is shown in FIG. 1. As shown, the automotive-type wheel includes several spoke holes or wheel holes 12, which may have various shapes and dimensions. It is these types of wheel holes 12 in which the present invention is needed.

Figure 2:
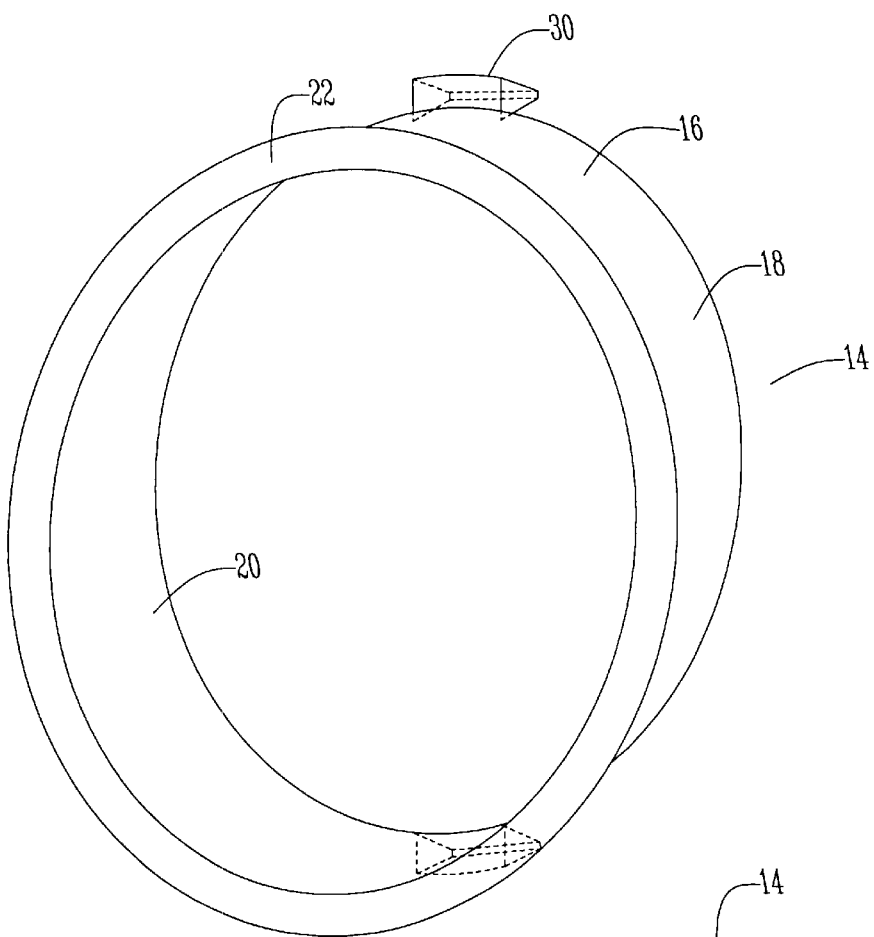
FIG. 2 is a perspective view of one embodiment of the wheel insert of the present invention.
Figure 3:
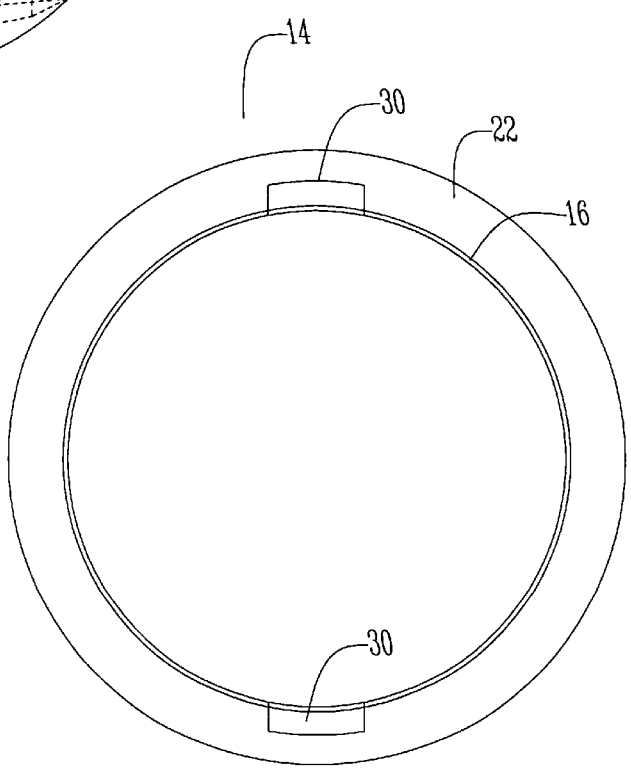
FIG. 3 is a rear, axial view of the wheel insert of the present invention.
Figure 4:
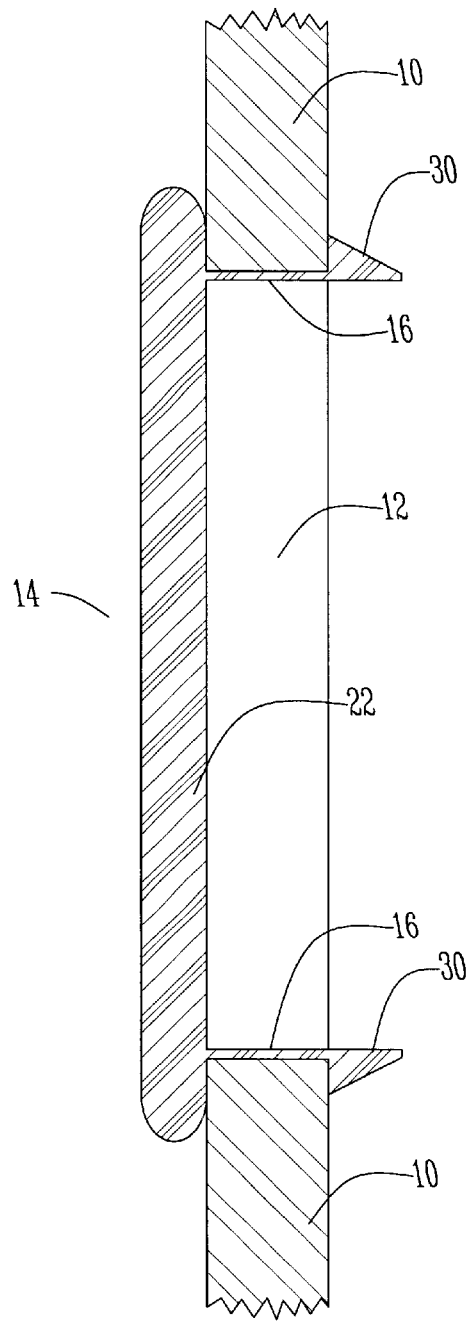
FIG. 4 is a side view of a wheel hole taken along line 5—5 of FIG. 1 including one embodiment of an installed wheel insert of the present invention.

As shown in FIG. 2, the wheel insert 14 of the present invention is comprised of a liner 16 which has an inner surface 18 and an outer surface 20. Additionally, the wheel insert 14 includes an exterior member 22. The exterior member 22 is a rim which extends beyond the diameter of the liner 16 as shown in FIG. 3. However, the exterior member 22 may also be a solid surface capable of covering, at least partially, the wheel hole 12 and/or displaying varying types of emblems, symbols, words, etc. as shown in FIG. 6. Some type of securing means is also incorporated into the wheel insert 14 of the present invention. As shown in FIGS. 2 and 3, the securing means is a plurality of tabs 30. As shown in FIG. 4, the tabs 30 extend beyond the rear surface of the wheel 10 defining the wheel hole 12. Therefore, the tabs 30, in conjunction with the exterior member 22 maintain the wheel insert 14 of the present invention in a proper position.

Figure 5:
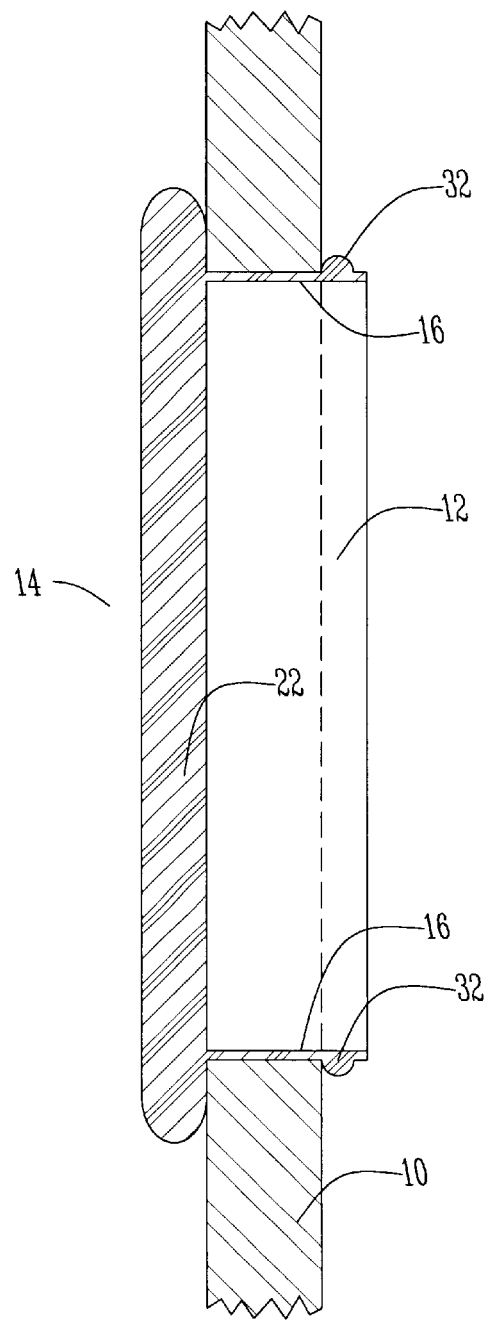
FIG. 5 is a side view of a wheel hole taken along line 5—5 of FIG. 1 including another embodiment of an installed wheel insert of the present invention.

An alternative to the tabs 30 is shown in FIG. 5. Plugs or detents 32 may be used to secure the wheel insert 14. The wheel insert 14 may be simply pushed into the wheel hole 12 until the plug 32 is secured behind the wheel 10. Therefore, the wheel insert 14 may be pressure fit inside the wheel hole 12 rather than snap fit. Of course, the wheel insert 14 of the present invention may be glued or secured in a proper position in any manner known to one of ordinary skill in the art.

The wheel insert 14 of the present invention may have many different sizes and shapes as shown in FIGS. 6 and 7. FIG. 6 illustrates a wheel insert 14 wherein the wheel insert is shaped like an oval and has a solid exterior member 22. FIG. 7 illustrates that the wheel insert 14 of the present invention may be shaped in any desired shape or size.

Referring again to FIG. 2, the outer surface 20 and the exterior member 22 of the present invention may be colored or plated to match any corresponding coloring or plating of the wheel 10 in which the wheel insert 14 is to be used. Preferably, the wheel insert 14 of the present invention is made of ABS injection-molded plastic and is then chrome plated. Additionally, the exterior member 22 may be adapted to accommodate a solid surface, a sculpted surface, or any design, logo, word, etc. Therefore, the present invention will allow the user of the wheel insert 14 to easily modify the appearance of the wheel holes 12 and the corresponding wheel 10.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. An accessory hole wheel insert for a wheel having a center hole and an accessory hole having an inner surface and an outer surface comprising:

a lining portion adapted to fit within the accessory hole;

an exterior portion for extending beyond the outer surface of the accessory hole; and a securing portion for maintaining the wheel insert in proper position in the accessory hole.

2. The accessory hole wheel insert of claim 1 wherein the securing portion is comprised of one or more tabs extending beyond the inner surface of the accessory hole.

3. The accessory hole wheel insert of claim 1 wherein the securing portion is comprised of one or more plugs extending outwardly from the liner for engagement with the accessory hole.

4. The accessory hole wheel insert of claim 1 wherein the accessory hole wheel insert is made of plastic.

5. The accessory hole wheel insert of claim 1 wherein the accessory hole wheel insert is chrome plated.

6. The accessory hole wheel insert of claim 1 wherein the lining portion is a circular-shaped ring.

7. The accessory hole wheel insert of claim 1 wherein the lining portion is a non-circular shaped ring.

8. The accessory hole wheel insert of claim 1 wherein the exterior portion is a circular shaped rim.

9. The accessory hole wheel insert of claim 1 wherein the exterior portion is a non-circular shaped rim.

10. The accessory hole wheel insert of claim 1 wherein the exterior portion is a solid surface.

11. An apparatus for altering the appearance of an automotive wheel having a center hole and an accessory hole, comprising:

a wheel insert having an inner portion and an outer portion wherein said inner portion is adapted to be placed within the accessory hole on the wheel; and a plug for maintaining the inner portion of the insert within the accessory hole.

12. The apparatus of claim 11 wherein the outer portion of the wheel insert is a circular ring.

13. The apparatus of claim 11 wherein the outer portion of the wheel insert is a non-circular ring.

14. The apparatus of claim 11 wherein the outer portion of the wheel insert is a solid surface.

15. The apparatus of claim 11 wherein the inner portion of the wheel insert is solid.

16. An accessory aperture insert for a wheel having a center aperture, at least one lug receiving aperture, and at least one accessory aperture comprising:

a lining portion adapted to securely fit within one of the at least one accessory apertures; and an exterior portion attached to the lining portion such that when the lining portion is fitted to the accessory aperture, the exterior portion extends beyond the accessory aperture.

17. The accessory aperture insert of claim 16 wherein the exterior portion includes a flange.

18. A system for a wheel having a center aperture, at least one lug receiving aperture, and a plurality of accessory apertures, comprising:

a plurality of separate accessory aperture inserts for protecting the plurality of accessory apertures; and each of the inserts having a lining portion adapted to securely fit within one of the plurality of accessory apertures and an exterior portion attached to the lining portion such that when the lining portion is fitted to one of the plurality of accessory apertures, the exterior portion extends beyond the one of the plurality of accessory apertures.

19. An apparatus for altering the appearance of an automotive wheel having a center hole and an accessory hole, comprising:

a wheel insert having an inner portion and an outer portion wherein said inner portion is adapted to be placed within the accessory hole on the wheel;

securing means for maintaining the inner portion of the insert within the accessory hole; and the outer portion of the wheel insert being a circular ring.

20. The apparatus of claim 19 wherein the securing means is a tab.

* * * * *